United States Patent
Thompson

(10) Patent No.: US 12,356,973 B2
(45) Date of Patent: Jul. 15, 2025

(54) CLIP-ON TEACHING AND PRACTICE CORD LINE FOR FLY CASTING

(71) Applicant: Robert Shawn Thompson, Loveland, CO (US)

(72) Inventor: Robert Shawn Thompson, Loveland, CO (US)

(73) Assignee: Robert Shawn Thompson, Fort Collins, CO (US)

( * ) Notice: Subject to any disclaimer, the term of this patent is extended or adjusted under 35 U.S.C. 154(b) by 0 days.

(21) Appl. No.: 19/010,502

(22) Filed: Jan. 6, 2025

(65) Prior Publication Data

US 2025/0134081 A1 May 1, 2025

Related U.S. Application Data

(63) Continuation-in-part of application No. 17/931,509, filed on Sep. 12, 2022, now Pat. No. 12,185,708.

(60) Provisional application No. 63/259,329, filed on Jul. 12, 2021.

(51) Int. Cl.
*A01K 91/12* (2006.01)

(52) U.S. Cl.
CPC .................................. *A01K 91/12* (2013.01)

(58) Field of Classification Search
CPC ...... A01K 85/08; A01K 91/03; A01K 91/047; A01K 91/12; A01K 91/14; A01K 91/16; G09B 19/24
USPC .................................................. 43/4.5, 44.98
See application file for complete search history.

(56) References Cited

U.S. PATENT DOCUMENTS

| | | | |
|---|---|---|---|
| 2,250,832 A * | 7/1941 | Hedge | A01K 91/12 43/44.98 |
| 2,893,158 A | 7/1959 | Haber | |
| 3,463,494 A | 8/1969 | Stroh | |
| 3,464,140 A * | 9/1969 | Carabasse | A01K 91/053 43/44.84 |
| 3,653,143 A | 4/1972 | Martuch | |
| 3,791,063 A * | 2/1974 | Harker | A01K 87/08 43/4.5 |
| 3,831,309 A * | 8/1974 | Martuch | A01K 91/00 43/44.98 |

(Continued)

OTHER PUBLICATIONS

"The Temple Fork Outfitters Bug Launcher Office Practice Fly Rod" https://tforods.com/product/bug-launcher-office-rod/.

(Continued)

*Primary Examiner* — Brady W Frazier
(74) *Attorney, Agent, or Firm* — Patricia C. Brzostowicz; Superior Patent Group, LLC Superior, CO

(57) ABSTRACT

The disclosure is an improved teaching and practice casting cord line for fly casting, wherein the improved casting cord line is attached to a fully functional fly fishing rod with a fly reel or a fly fishing line. The improved fly teaching and practice casting training cord line is comprised of two different types of cord material, wherein the first cord is #95 paracord which is heavier than the second cord type. The second cord consists of 2 mm macrame cord which is lighter than the first cord type and has a diameter almost 14 times thicker than traditional fly line leader. The cords used in the production of the invention are composed of material not used in fly line construction. This teaching and practice cord for fly casting is not intended for use on water.

20 Claims, 7 Drawing Sheets

(56) References Cited

U.S. PATENT DOCUMENTS

| | | | | |
|---|---|---|---|---|
| 3,841,015 A * | 10/1974 | Gregory | ................ | A01K 91/00 |
| | | | | D22/134 |
| 3,888,037 A * | 6/1975 | Warthen | ................ | A01K 91/00 |
| | | | | 43/44.98 |
| 4,524,540 A * | 6/1985 | Wulff | ................... | A01K 91/12 |
| | | | | 43/44.98 |
| 4,550,938 A * | 11/1985 | Nakanishi | ............. | A01K 91/04 |
| | | | | 403/291 |
| 4,604,821 A * | 8/1986 | Moser | ................ | A01K 91/047 |
| | | | | 87/8 |
| 5,297,355 A | 3/1994 | O'brien | | |
| 5,397,131 A | 3/1995 | Kraemer | | |
| 5,469,652 A * | 11/1995 | Drosdak | ............. | A01K 91/047 |
| | | | | 59/95 |
| 5,678,351 A * | 10/1997 | Halterman, Jr. | ....... | A01K 91/12 |
| | | | | 43/43.15 |
| 5,738,556 A * | 4/1998 | Palmieri | ................ | B63B 32/70 |
| | | | | 441/75 |
| 5,987,808 A * | 11/1999 | Coles | ..................... | G01G 19/60 |
| | | | | 224/103 |
| 6,282,830 B1 * | 9/2001 | Henry | ................. | A01K 91/065 |
| | | | | 43/4.5 |
| 6,412,211 B1 | 7/2002 | Smith | | |
| 6,418,660 B1 * | 7/2002 | Shinagawa | ........... | A01K 91/12 |
| | | | | 43/44.98 |
| 6,421,950 B1 | 7/2002 | Constantin | | |
| 6,763,628 B1 | 7/2004 | Bartlett | | |
| 6,918,202 B2 | 7/2005 | Merritt | | |
| 7,272,907 B1 * | 9/2007 | Andrews | ............. | A01K 91/047 |
| | | | | 43/4.5 |
| 7,861,457 B2 * | 1/2011 | Blette | ................. | A01K 91/047 |
| | | | | 43/43.1 |
| 7,877,924 B2 * | 2/2011 | Schoenike | ............. | A01K 93/00 |
| | | | | 43/43.1 |
| 2006/0123691 A1 | 6/2006 | McBride | | |
| 2007/0102884 A1 | 5/2007 | Hinz | | |
| 2009/0142132 A1 * | 6/2009 | Klein | .................... | A01K 91/12 |
| | | | | 403/301 |
| 2015/0013211 A1 * | 1/2015 | Schoenike | ............ | A01K 91/03 |
| | | | | 43/44.91 |
| 2018/0374382 A1 | 12/2018 | Osimo | | |
| 2020/0029542 A1 * | 1/2020 | Ouellette | ............... | A01K 97/08 |
| 2020/0383307 A1 * | 12/2020 | Hsieh | ..................... | A01K 91/12 |

OTHER PUBLICATIONS https://www.amazon.com/Redington-Form-Game-Fly-Line/dp/B009DSOJMO.

"The Temple Fork Outfitters Bug Launcher Office Practice Fly Rod" aka. The Office Fly Rod https://youtu.be/DUiVUOFE-Zs YouTube video hosted by Lefty Kreh of Temple Fork Outfitters.

Explanation of the principle of wind resistance https://www.flyfishersinternational.org/Learn/Other-Resources/Fly-Fishing-Glossary.

Fly fishing glossary with explanations of fly fishing casts and terminology https://www.cabelas.com/shop/en/White-River-Fly-Shop-General-Practitioner-Practice-Fly-Rod Link to Cabelas Outfitters. Fly fishing rod with no reel seat.

Theflyfishingbasics.com: Website featuring explanations of the sizes, diameters and material construction and properties of fly fishing leaders.

Orvis PractiCaster Fly Rod; https://www.orvis.com/practicaster/2NJ6.html Link to orvis.com, Orvis PractiCaster Fly Rod. This product has a very thick line and no reel seat.

Farbank.com > pages > redington: Far Banks is the parent company that owns Redington Fly Rods, Sage Fly Rods and Rio Fly Lines. Redington.com: Website for The Redington Form Game Fly Rod. This rod has No. reel seat. I found this product to be unwieldy while false casting.

Echo Micro Practice Fly Rod; https://youtu.be/2_e7djaYzyg Link to YouTube video.

White River Fly Shop General Practitioner Practice Fly Rod: Practice line thicker than practice rod's tip-top eyelet and guides makes it difficult to shoot line.

Pros.rajeffsports.com: Echo Fly Rods, "Echo Micro Practice Fly Rod", https://www.scientificanglers.com/product/groove-practice-fly-rod/ : Link to The Scientific Anglers Groove Practice Fly Rod. M Maximumcatch Maxcatch 4'0" Practice Fly Rod Casting 2 Pieces Fly Fishing Rod: Link to Maximumcatch Maxcatch 4'0"—https://www.amazon.com/MAXIMUMCATCH-Maxcatch-Practice-Fly-2-Piece/dp/B07KG5SCL7.

Practice Fly Rod Casting 2 Pieces Fly Fishing Rod. Thick yarn line practice fly rod. https://www.reference.com/science/wind-resistance-7e0073293b5d40a7.

* cited by examiner

CLIP-ON TEACHING AND PRACTICE CORD LINE FOR FLY CASTING

The following application is a continuation-in-part application for patent under 35 USC 111 (a) claiming priority to U.S. application Ser. No. 17/931,509 filed Sep. 12, 2022 by the same applicant and inventor. This application claims priority to U.S. Provisional Application No. 63/259,329 filed Jul. 12, 2021.

FIELD OF INVENTION

This disclosure is an improved clip-on fly fishing training cord line, being a tool for teaching and practice of fly casting.

BACKGROUND

Fly fishing is an angling, or fishing technique, or method that uses a light-weight lure, called an artificial fly, to catch fish. The fly is cast using a fly rod, reel, and specialized weighted line, wherein the fly is propelled by the weight of the line. "False casting" is a term used for casting a fly fishing line back and forth repeatedly and can be a useful tool and integral part of teaching the basic fly fishing cast. But prior art devices fail to provide an inexpensive, instructionally effective, and versatile tool to learn casting for fly fishing. There is a need in the field for an effective tool to teach fly casting.

SUMMARY OF THE INVENTION

This disclosure provides a clip-on training line for fly fishing rods. The training line may be attached, with clip or other mechanism, to any fly fishing rod whether fitted with its own fishing line or not. Inasmuch the fly fishing training line of the present disclosure comprises a first end and a terminal end, and is composed of two types of cord, a heavier weight cord and a lighter weight cord. The heavier weight cord is disposed between two sections of the lighter weight cord. The fly fishing training line may further comprise a clip on the first end to attach to fly fishing rod. The heavier weight cord may be disposed closer to the terminal end. The heavier weight cord segment may be disposed less than one-fourth or less than one-third of the length of the training line from the terminal end. The heavier weight cord may be at least two times heavier, or three times heavier, or four times heavier, or at least five times heavier than the lighter weight cord. The training line may further comprise a frayed cord, or imitation fly, or tagged end on the terminal end of the training line.

The training line may comprise a first single, continuous segment of the lighter weight cord which comprises at least two-thirds of the length of the training line at the first end. The training line may comprise a second single, continuous segment of lighter weight cord which comprises at least one-fifth of the length of the training line at the terminal end. A training line wherein a first single, continuous segment of the lighter weight cord comprises at least two-thirds of the length of the training line at the first end, a second single, continuous segment of lighter weight cord comprises at least one-sixth of the length of the training line at the terminal end, and a single, continuous segment of the heavier weight cord, disposed between the first segment of the lighter weight cord and second segment of the lighter weight cord, comprises at least one-sixth, is disclosed. Further, wherein the first segment of lighter weight cord is one color designated color 1, the second segment of lighter weight cord is another color, designated color 2, and the segment of heavier weight cord another color different from color 1 and color 2.

The disclosure further comprises a method for teaching fly fishing, wherein the method comprises the steps of: forming a training line using a first and second type of cord, wherein both types of cord are heavier per meter than a fishing line included on the fly fishing rod and the second type of cord is at least 5 times heavier than the first type of cord and represents less than V/a the length of the training line; disposing the second cord between two pieces of the first cord with the second type fitted closer to a fly end or terminal end of the training line than to an end fitted with a clip; and attaching the training line with the clip to a fly fishing rod. The disclosed method for teaching fly fishing wherein a first piece of the first cord is fitted to the clip and makes up at least two-thirds the length of the training line. The disclosed method may further comprise fraying the end of a second piece of the first cord at the terminal end. The invention further comprises a fly fishing training line comprising a single unsegmented cord comprising a clip on one end and imitation fly on the other end, the training line further comprises an attached fly fishing rod with a reel and casting line attached thereto.

The disclosure further comprises an improved fly casting training cord line, method of forming an improved fly casting training cord line, and method for teaching and perfecting fly casting using the improved fly casting training cord line of the present disclosure. In one embodiment, the disclosure is an improved teaching and practice cord line for fly casting, wherein the improved casting training cord line is attached to a fully functional fly rod with a fly reel or a fly fishing line. The improved fly casting training cord line is comprised of two different types of cord material, wherein the first cord is #95 paracord which is heavier than the second cord. The second cord section consists of 2 mm macrame cord which is lighter than the first cord and has a diameter almost 14 times thicker than traditional fly line leader. The cords used in the production of the invention are composed of material not used in fly line construction. This teaching and practice cord for fly casting is not intended for use on water.

Inasmuch, in one embodiment, the disclosure comprises an improved fly casting training cord line comprising: a first end and a terminal end; a heavier weight per unit length cord of a first diameter attached at the first end; a lighter weight per unit length cord of a second diameter attached at the terminal end; and wherein the first diameter is smaller than the second diameter. The improved fly casting training cord line may further comprise a clip attached at the first end. The improved fly fishing line may further comprise an imitation fly attached at the terminal end. In another embodiment, the heavier weight per unit length cord is a paracord and the lighter weight per unit length cord is a macrame cord. In another embodiment, the wherein the paracord is #95 paracord. In another embodiment, the macrame cord has a diameter of 2 mm. In another embodiment, the heavier weight per unit length cord comprises at least sixty percent of the fly casting training cord line. In another embodiment, the heavier weight per unit length cord is connected to the lighter weight per unit length cord via a shrink tube. In another embodiment, the heavier weight per unit length cord is connected to the lighter weight per unit length cord via glue and a shrink tube. In another embodiment the improved fly casting training cord line is packaged as a stand-alone product. In yet another embodiment the improved fly casting training cord line further comprises a package for sale of the fly casting training cord line as a stand-alone product.

The present disclosure comprises a method of forming a fly casting training cord line, the method comprising: forming a fly casting training cord line having a first end and a second end; wherein the fly casting training cord line comprises two different line materials, a heavier material of a first diameter disposed at the first end, and a lighter material of a second diameter disposed at the second end; and wherein the first diameter is less than the second diameter. The method may further comprise connecting an imitation fly at the second end. In another embodiment, the line materials are connected via shrink tubing. In another embodiment, the line materials are connected via gluing and shrink tubing. In another embodiment, the heavier material comprises at least 65% of the fly casting training cord line.

The present disclosure comprises a method of learning fly casting comprising: forming a fly casting training cord line having a first end and a second end; wherein the fly casting training cord line comprises two different line materials, a heavier material of a first diameter disposed at the first end, and a lighter material of a second diameter disposed at the second end; wherein the first diameter is less than the second diameter, fitting the fly casting training cord line to one of a fly fishing rod, a fly fishing line of the fly fishing rod, or a fly fishing line backing of the fly fishing rod; and using the fly fishing rod to cast the fly casting training cord line. In another embodiment, the fly casting training cord line is connected to a backing of the fly fishing line. In another embodiment, the fly casting training cord line is connected to a fly line of the fly fishing line. In another embodiment, the fly casting training cord line is connected to a fly fishing rod reel.

Before explaining the disclosed embodiments of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE INVENTION

Figure 1:
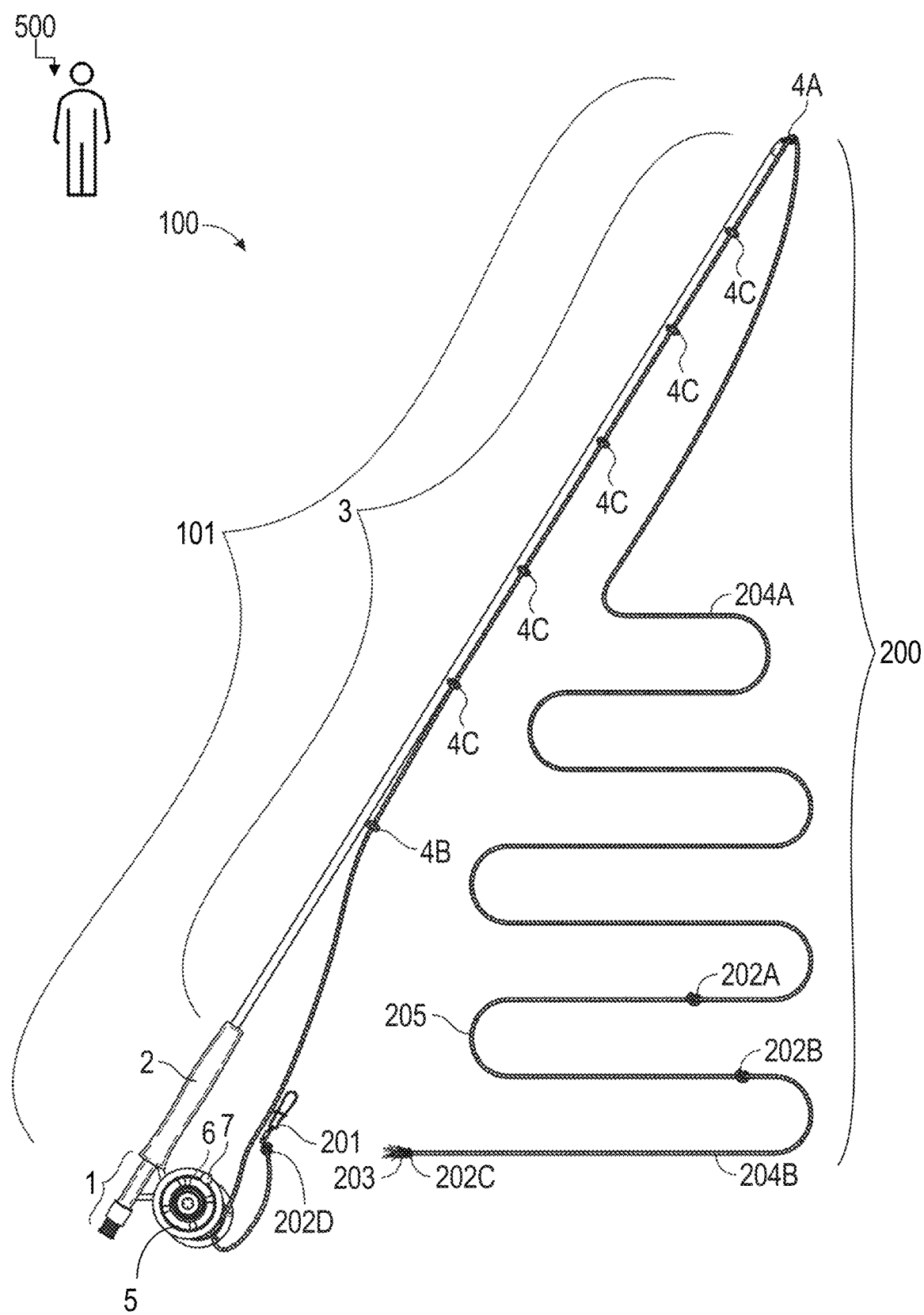
FIG. 1 is an illustration of a fly fishing rod and training line of the present disclosure.

The parts of a basic fly fishing rod 100 as illustrated in FIG. 1 include the reel seat 1 or end of the rod held closest to the fisher's body, the handle 2, the rod 3, which is the body of the fishing rod, the tip top eyelet 4A which is positioned at the end of the rod held in an opposite position from the fisher's body, the reel 5, a spindle-like or spool-like device that holds the fly fishing line and backing 6, the reel handle 7, the stripping guide 4B, and snake guides 4C. Illustrated attached thereto is the training line 200 of the present disclosure, a training line that is attached to any fly fishing rod and is an effective tool to learn casting. As illustrated in FIG. 1, the disclosed training line 200 may be connected to the reel 5 via clip 201 and threaded through the stripping guide 4B, snake guides 4C, and tip top eyelet 4A such that the training line 200 mimics the action of the fly fishing line 6 for training purposes. Although a clip is disclosed other means of attachment not limited to knotting or tying the end of the training line to the fly fishing rod is envisioned. Further, the training line may be attached at various points on the fly fishing rod such as the rod itself 3, or the stripping guide 4B, snake guides 4C, or tip top eyelet 4A. One may envision that it could even be attached to any line 6 held on the reel 5.

In general, the standard length for a fly fishing rod from end of reel seat 1 to tip top eyelet at 4A 101 is 9 feet (ft). In fly fishing, fisher's cast long lines into streams, rivers, or other bodies of water at long distances. There are different types of casts and each takes practice to perfect. Several prior art training devices are available for learning fly fishing. For instance, a product called "The Temple Fork Outfitters Bug Launcher Office Practice Fly Rod" or "The Office Fly Rod". This product being 38 inches in length consists of a three-piece sectional fly fishing rod and does not include a reel seat with a reel attached to it to hold a fly fishing or casting line. "The Office Fly Rod" uses a thick cord line to slow down the fly fishing cast. It functions on the principle that a thick, air or wind resistant line slows down the casting motion and decreases the overall speed of the line. It's designed for practicing various types of casts, and also for teaching the user the timing and motions used in the basic fly fishing cast. It is intended primarily for indoor, short distance casting practice as its name implies. There are several practice rods manufactured, and all of these products are sold with short rods that range in length between 3' to 5'4.5" and do not include a reel seat or reel to hold a fly fishing line. However, use of this short rod without a reel seat limits the ability to switch to actual fishing following a training session as a second fishing rod would be needed. Another type of teaching tool on the market is a "Redington Form Game Fly Rod". Unlike the fly fishing practice rods noted above, the "Redington Form Game Fly Rod" uses an actual fly fishing line and leader instead of a thick, heavy cord line. It uses a large air or wind resistant yarn material fly to slow down the casting motion. This product is unwieldy while false casting, a type of casting where the line is cast back and forth repeatedly, a technique used to dry off the fly or to change the direction of the cast. As false casting is a crucial tool in teaching fly fishing casting, this "Redington Form Game Fly Rod" did not meet the requirements of a real fly fishing rod that was useful for teaching and practicing fly fishing casts as well as actual fishing.

Figure 2:
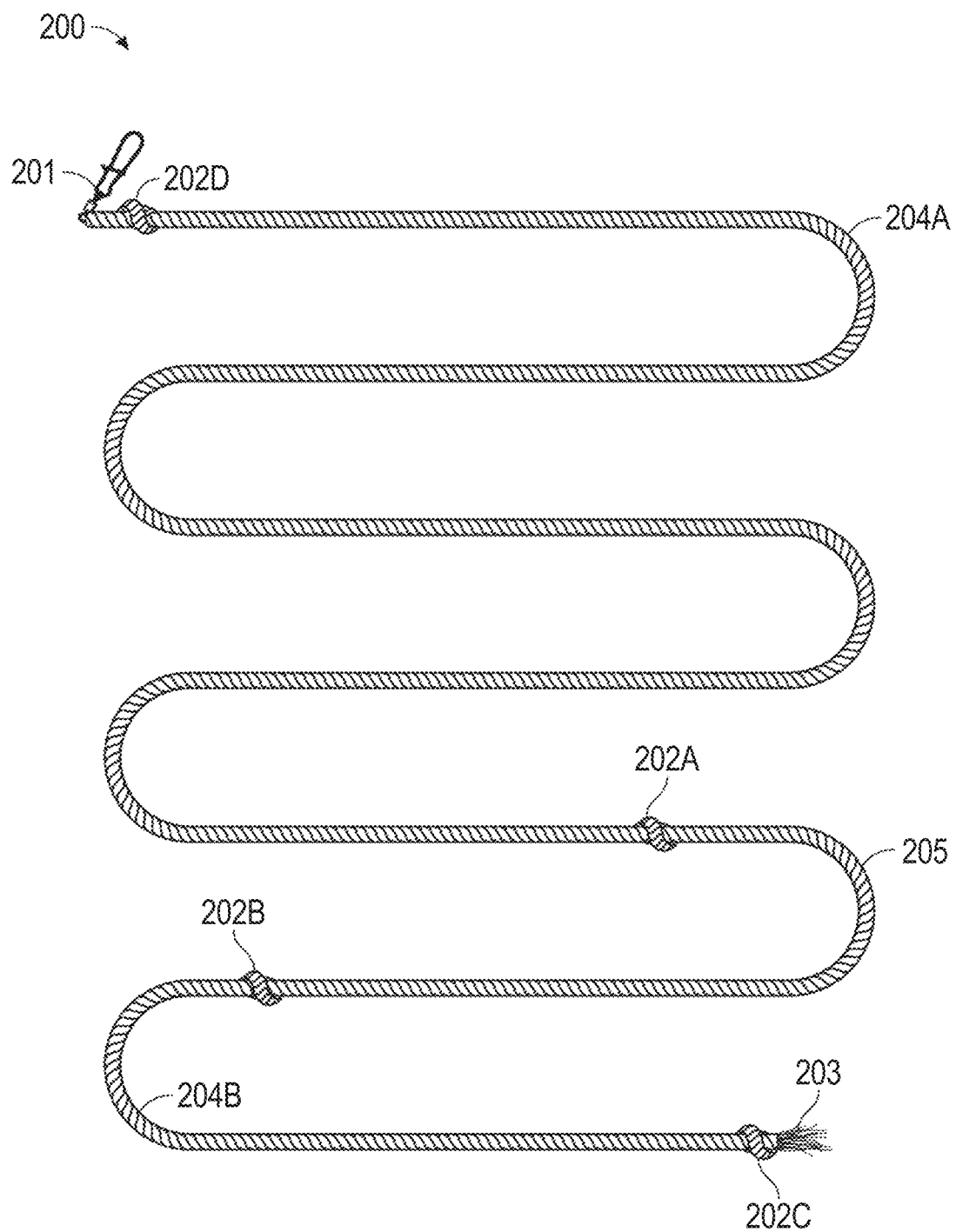
FIG. 2 illustrates the training line of the present disclosure.

As illustrated in FIG. 1 and FIG. 2, the present disclosure is a training line 200 for fly fishing rods and is a casting tool that improves the fishers timing as it relates to the optimal moment to start the forward cast and the back cast, this optimal moment is signaled by a light tug on the line as it reaches its maximum back and maximum forward trajectory. Unlike regular fly lines, the disclosure is devised to be heavy enough to produce a more noticeable tug but is still light enough to not generate undue arm fatigue. The training line 200, FIG. 1, FIG. 2 can be attached to a standard fly fishing rod 100, FIG. 1 or any other fly fishing rod, and is illustrated in greater detail in FIG. 2. The training line 200 comprises an optional clip 201 on one end attached with a knot 202D to a first type of cord 204A. The 204A cord is attached to a second type of cord 205 of different heavier material with a knot 202A on one side and second knot 202B on the other which attaches the second section of cord 205 to a third section of cord 204B. The first section 204A and second section of cord 204B are of similar or the same material and weight. The tail end or fly end 203 that is a frayed end of a cord, held by knot 202C of the training line 200, may be comprised of a short piece of the same cord material as used for 204A, 204B as is described further in the Example below. However, a tail end or fly end 203 may be formed by the end of the second section of cord 204B with knot 202C placed to stop fray or unwinding of cord 204B.

Figure 3:
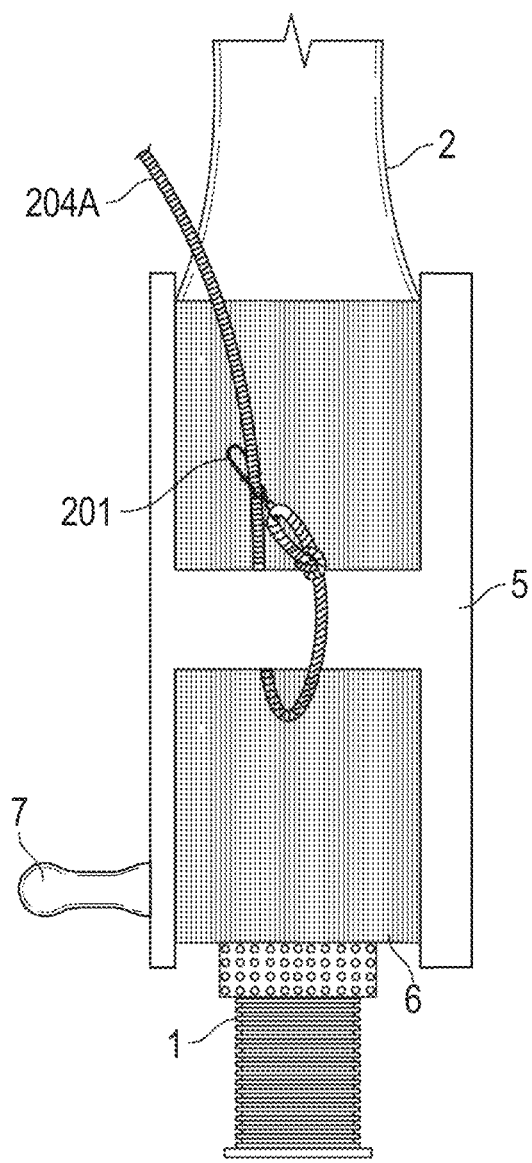
FIG. 3 illustrates a method of attaching the training line of the present disclosure.

As illustrated in FIG. 3, the additional training line end 204A may be clipped or attached in some manner to the reel 5 attached to a reel seat 1 with clip 201. The reel 5 functions to hold the fly fishing line 6 which is wound around a spindle called an arbor. The reel handle 7 turns the reel 5 during use and fly fishing rod held at the grip 2. In as much the disclosure also comprises method for teaching fly fishing with disclosed training line 200 attached to a fly fishing rod designed for catching fish. The disclosure comprises a separate training line 200, FIG. 2 that may be used with any fly fishing rod. Although shown to be attached to the reel, the training line 200 may be attached to various points on the fly fishing rod 101 including but not limited to the rod itself 3, or the stripping guide 4B, snake guides 4C, or tip top eyelet 4A and may be of various lengths as described in Examples below.

Figure 4B:
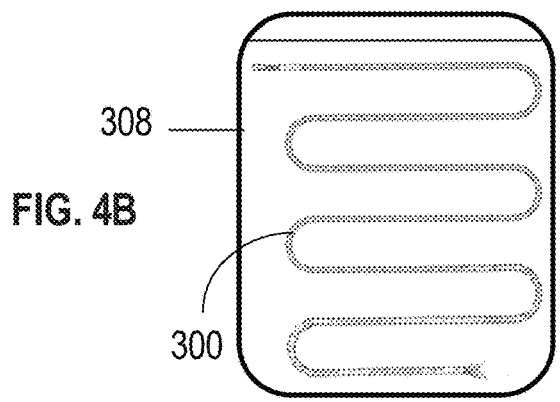
FIG. 4A illustrates an improved fly casting training cord line of the present disclosure and FIG. 4B illustrates an example package containing the improved fly casting training cord line.
Figure 4A:
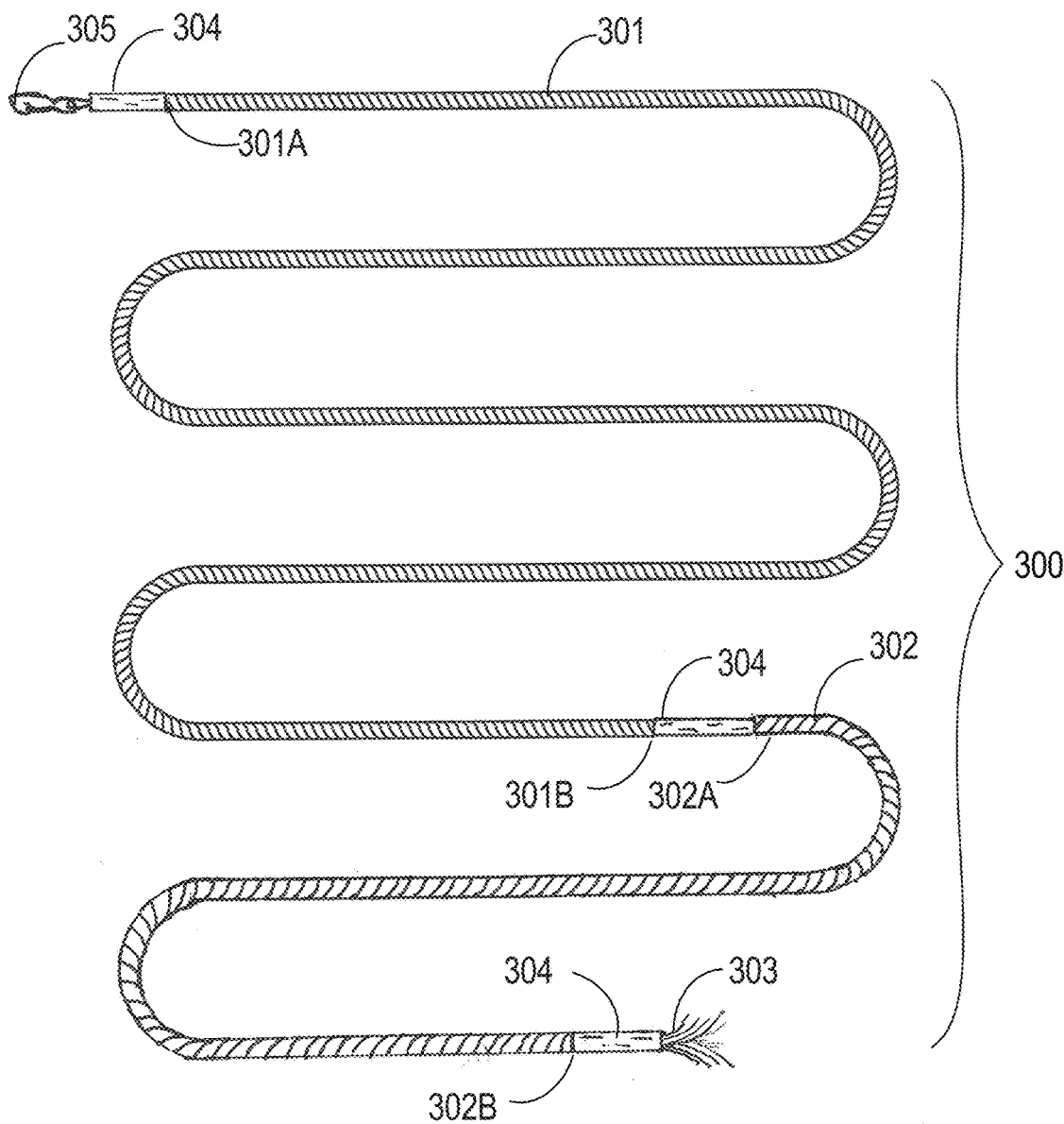

An improved fly casting training cord line 300 is illustrated in FIG. 4A. As shown in FIG. 4A, the improved training cord line 300 comprises a first section of cord 301 that comprises a paracord material. The first section of cord 301 connects to an attachment means, being a training line connector 305, being a clip or other training line connector 305, which may be a connecting means or mechanism, at a first end 301A and to a second section of cord 302 at a second end 301B via a cord connector 304, which may be a connection means or mechanism. The training line connector 305, which may be a clip, clamp, or other attachment means, in non-limiting examples including a knot, functions to attach the improved fly casting training cord line 300 to a fly fishing rod, fly fishing line, backing, or portion of a fly fishing line. The first section of cord 301 may comprise about half, or about at least fifty percent, or fifty-five percent, or sixty percent, or sixty-five percent, or seventy percent, or about seventy-five percent of the entire improved training line 300. The second section of cord 302 comprises a lighter weight cord than the first section of cord 301. The second section 302 of lighter weight cord may comprise for example a macrame cord that may be a thicker cord in diameter and more wind resistant than the first section of cord 301 but be less dense and therefore lighter in weight. The second section of cord 302 is connected to the first section of cord 301 at a first end of the second section of cord 302A. At the second end 302B of the second section of cord 302 a cord connector 304 connects the second end of the second section of cord 302 to a faux, or imitation, fishing fly 303 that comprises an unraveled section of a cord material such as a paracord or macrame, or other cord material.

As depicted in FIG. 4B, the improved fly casting training cord line 300 may be packaged alone as a solo, stand-alone product for commercial sale in a package 308 designed to fit the improved fly casting training cord line 300. Offering this product as a stand-alone improved fly casting training cord line 300 offers users the opportunity to gain the benefit of perfecting their fly casting technique without purchasing an additional fly fishing rod or practice fly fishing rod. In addition, as illustrated in the following figures and examples, the improved fly casting training cord line 300 can be used with any fly fishing rod and fly fishing reel system or device and offers a convenient, affordable casting teaching and practice solution.

The line on a fly fishing reel consists of three key components: backing, fly line, and leader. The backing, typically made of Dacron, nylon, or monofilament, is wound onto the reel first. The length of backing is typically 75-100 yards in length. Its primary function is to give the fly fisher a reserve of line in the event of hooking a large fish that can't be played with the average 90 feet length of a fly line. The secondary function of the backing is to take up space on the spool so that a tightly wound, pigtail coiling effect called line memory will be lessened ensuring that the fly line and leader sets on the water in a smooth uncoiled manner. The fly line, a weighted line responsible for delivering the fly to the target, is attached to the backing via loops or knotting. Fly line is either floating for dry fly fishing or sinking for nymph or midge submerged fishing. Fly fishing lines vary in weight (measured in grains), taper (weight distribution), and length. The average length of a fly line is 90 ft but can run from 85-120 ft depending on the application. Current fly line design usually includes a preformed loop, for loop to loop knotless connections on both the backing, fly line, and leader for the convenience of the fly fisher. The leader is a tapered length of monofilament or fluorocarbon that connects the fly line to the fly. Leaders gradually decrease in diameter, improving presentation and reducing visibility to the fish. Leader comes in floating or sinking varieties in average lengths of 7.5 feet-12 feet. The choice of leader length and material depends on the rod length or fishing situation. Fluorocarbon is sometimes preferred for its low visibility and abrasion resistance.

The macrame second section of cord 302 is wider than a leader line at 2 mm in diameter, being fourteen times thicker than the micro thin fly leader line used for fly fishing. The density of the macrame second section of cord 302 makes it lighter in weight than the first section of cord 301. While a fly fishing line leader would have the goal of not being obvious or "seen" by the fish, the present improved training cord line 300 has an opposite goal, of being seen by the user so fly casting can be perfected. Unlike a fly fishing line which uses a tapered line to produce a weight forward feel, the differences in weight of the first section of cord 301 and the second section of cord 302 produce this effect without using a tapered line.

As defined herein a paracord is generally a high tensile strength man-made fiber cord comprising an outer layer or sheath and one or more strands or fibers which form the core, wherein the strands or fibers of the core may be twisted or weaved together to promote strength of the cord. A macrame cord is a single layer with a hollow core, or no core, and a lower tensile strength with only strands or fibers woven or twisted together to form cord. Macrame cord may be made from man-made or natural fibers. A weight of cord is defined as a weight per unit length of cord.

Figure 5A:
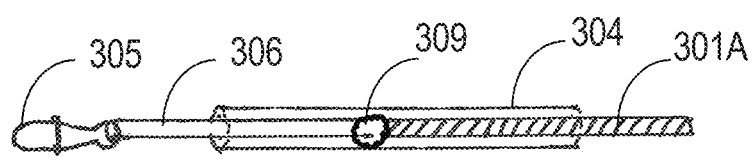
FIGS. 5A-5C illustrates connecting means between portions of the improved fly casting training cord line of the present disclosure.
Figure 5B:
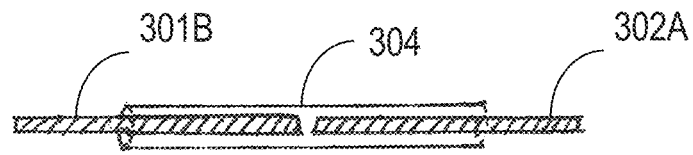
Figure 5C:
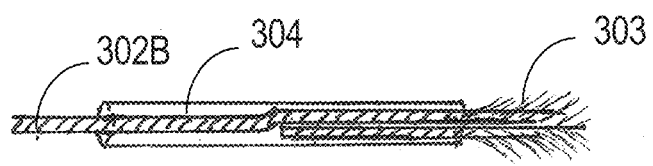

As illustrated in FIGS. 4, 5A, 5B, and 5C, the improved training cord line 300 includes cord connectors 304 that connect the first section of cord 301 to the second section of cord 302, as in FIG. 5B, to the fly 303, as in FIG. 5C, and to the training line connector 305, as in FIG. 5A. As shown in more detail in FIGS. 5A-5C, the cord connector 304 may comprise a sleeve or shrink tube material cord connector 304 that can be heated to join ends together. A shrink tube material cord connector 304 may comprise a dual-walled adhesive lined heat shrink tube in one non-limiting example. Other types of shrink tube material whether single-walled, or dual-walled, adhesive-lined, or non-lined, shrink tube may be employed. Other cord connector 304 types may be envisioned including but not limited to melting ends of sections of cord 301, 302 together, knots, clamps, clips, glue 309, or gluing, or other types of connectors or means of connecting cord material. The glue 309, being a super glue, or other type of adhesive, may be redundant and not required as the cord connector shrink tube 304 may adequately connect the sections of cord 301, 302. As further illustrated in FIGS. 5A-5C, the training line connector 305 may have a small section of cord or line 306 attached thereto to use to connect to the first section of cord 301/301A. The cord or line that forms the fly 303 may be a cord connected to the end of the second section of cord 302/302B as shown in FIG. 5C or may be formed of the same second section 302. The cord connector 304 on the end of the second section of cord 302/302B may serve to seal the end of the second section of cord 302 to the fly 303 end.

Figure 6:
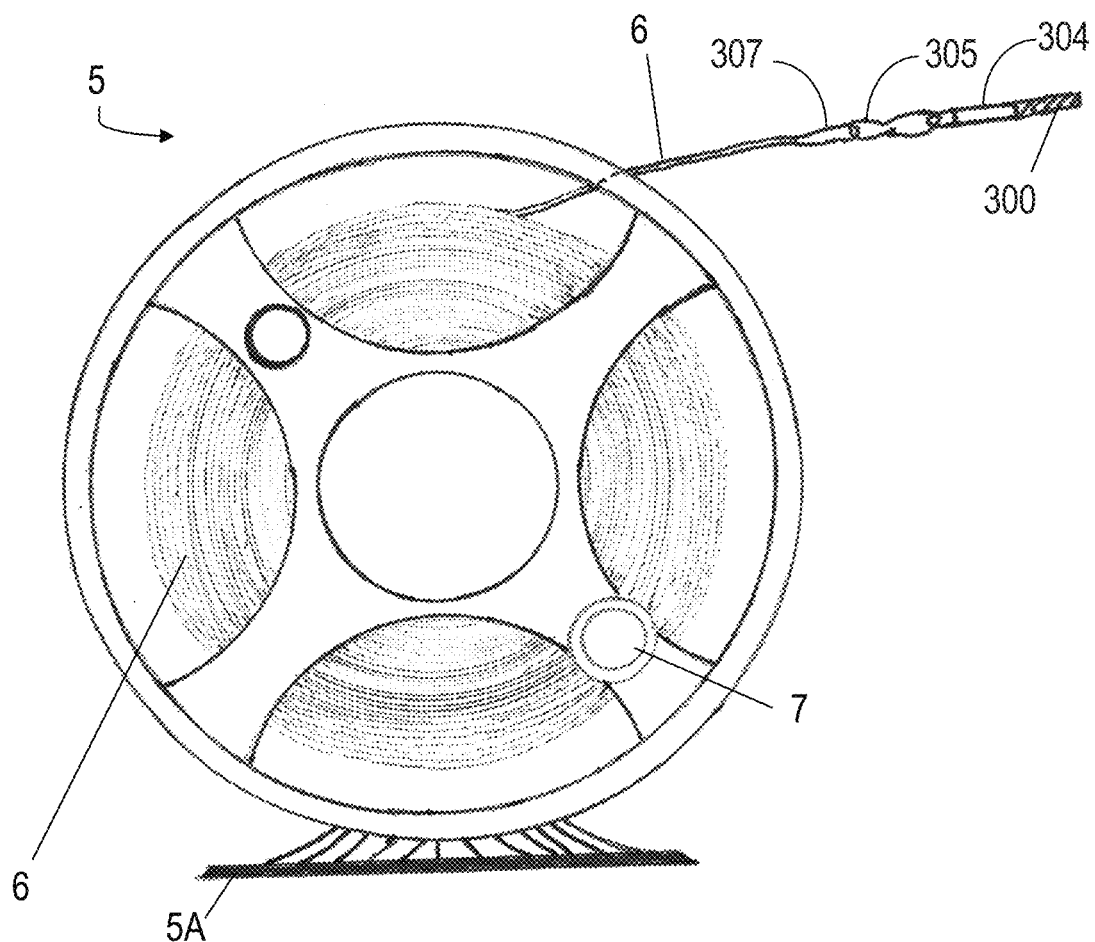
FIG. 6 illustrates a fly fishing reel with backing and fly line attached to the improved fly casting training cord line of the present disclosure.

In addition to the improved fly casting training cord line 300 being able to be attached at, near, or to the fly reel 5, as illustrated in FIG. 3, FIG. 6 illustrates a fly fishing reel 5 with a fly fishing line 6, including the backing and fly line, spun thereon. The base of the reel 5A can be attached to the reel seat 1 of the fly fishing rod as shown in FIG. 1. The improved training cord line 300 may be attached to the fly fishing line 6, via a loop 307 on the fly line 6, and threaded through the stripping guide 4B, snake guides 4C, and tip top eyelet 4A shown in FIG. 1 for learning and practice of casting. If a loop 307 for connection is not included on the fly line, a loop, clip, or other connector means 307 may be formed from, fit to, or connected on the end of the fishing line 6. A training line connector 305 of the improved training cord line 300 may serve to connect the improved training cord line 300 to the fly fishing line 6 loop 307. In this way the improved training cord line 300 of the present disclosure may be attached to a fly fishing line 6 for practice or training purposes.

Figure 7:
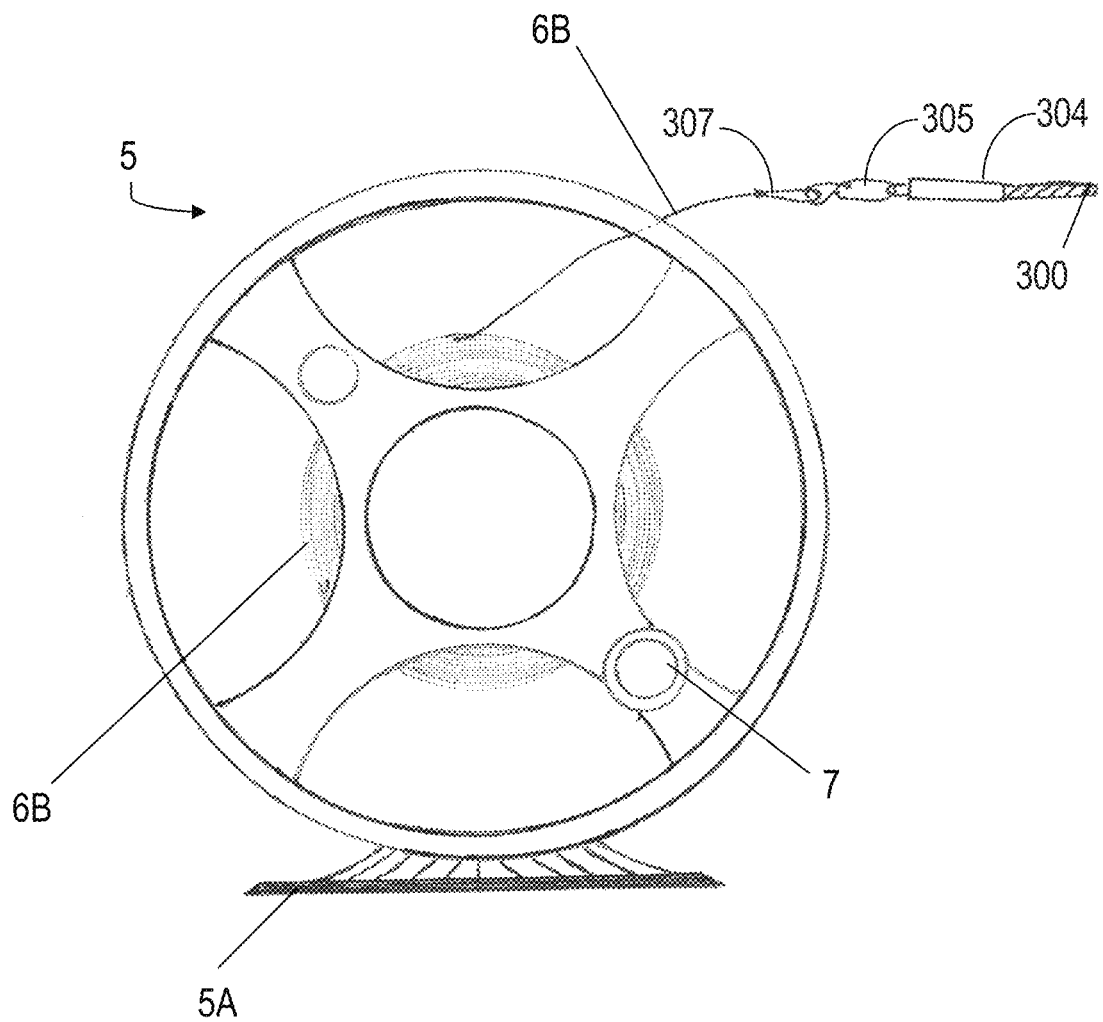
FIG. 7 illustrates a fly fishing reel holding a backing line attached to the improved fly casting training cord line of the present disclosure.

As illustrated in FIG. 7, the improved training cord line 300 may be attached to only the backing portion 6B of a fly fishing line and threaded through the stripping guide 4B, snake guides 4C, and tip top eyelet 4A shown in FIG. 1 for learning and practice of casting. A loop, clip, or other fly fishing line connector 307, which may be a loop may be formed in, fit on, or connected to the backing 6B if one is not included on the line. A training line connector 305, or other connector means, of the improved training cord line 300 may serve to connect the improved training cord line 300 to the backing 6B via the loop 307. In this way the improved training cord line 300 of the present disclosure may be attached to a backing 6B of a fly fishing line 6 for practice or training purposes. In further examples, the improved training cord line 300 may be attached to any portion or portions of a fly fishing line including but not limited to the backing, fly line, or leader.

EXAMPLES

Example 1

As an example, the disclosed training fly fishing line 200, FIG. 1, FIG. 2 utilizes a 2 millimeter (mm) cord, a macrame craft cord in one example, as a first type of cord 204A, 204B, FIG. 2 which is approximately more than twice as thick as standard fly fishing line. The cord or macrame craft cord may be made from cotton, recycled cotton, bamboo or other synthetic or natural materials such as nylon, polyesters, hemp or the like and may be braided cord, three-ply rope, or single strand rope. A diameter of at least 1 mm, or at least 1.2 mm, or at least 1.5 mm, or at least 1.75 mm, or at least 2 mm or wider macrame cord may be utilized. The weight of the cord may be at least 0.3 kilogram (kg)/300 meters (m), or at least 0.4 kg/300 m, or at least 0.5 kg per 300 m, or more. For the second type of cord 205, FIG. 2, a #95 paracord was utilized being heavier material than the 2 mm craft cord. The #95 paracord 205 is a 0.07 inch (in) or 1.75 millimeter (mm) diameter cord. As such, the second type of cord 205 may be at least 1 mm, or 1.25 mm, or 1.5 mm, or 1.75 mm, or more in diameter. The weight of the second type of cord 205 may be at least 4 kg/300 m, or at least 4.5 kg/300 m, or at least 5 kg/300 m, or at least 5.5 kg/300 m, or at least 5.9, or at least 5.95 kg/300 m, or more. This weight of the second type of chord 205 serves to give the line the weight forward characteristic of most of the fly fishing lines available in current fly fishing line design. It provides for better distance, better casting in windy conditions and improved leader turnover and balance. The first type of cord 204A, 204B was a red 2 mm macrame craft cord which is highly visible, unlike fly fishing leaders that are generally composed of monofilament or fluorocarbon with a transparent micro thin diameter measuring between 0.003"-015". A green #95 paracord was utilized for the second type of cord 205 which in combination with the red macrame 204A, 204B cord gave the disclosed device an easy to view combination of color fly fishing line while decelerating the practice lines back and forth trajectory. An alternate design includes a blue macrame 204A cord. This gives the caster the facility to analyze their technique in real time by weight, site, and timing. The disclosed training line 200 has a 32 feet (ft) total line length, which when the clip 201 is attached to the reel 5 of a 9 ft pole, results in about 23 ft of casting line. This 32-foot training line 200 may be at least 200 grains, or at least 225 grains, or at least 250 grains total weight. Historically, fly lines have been measured by grain weight (otherwise known as grainage) in the first 30 feet of line. The weightier paracord segment 205 may comprise at least 0.5/5 or at least 0.8/5 or at least ⅕ of the entire weight of the training line 200. This casting distance represents the casting motion and feel of an average fly fishing cast to the user. I have used this invention clipped onto the preformed loop on my fly fishing line and then I extend about 5 ft of the fly fishing line beyond the tip-top eyelet of my fly rod for a casting distance of 37 ft which exceeds the "Redington Form Game Fly Rod" by approximately 11 ft. This notably longer length simulates long distance fly casting. I only recommend this extended line length to experienced casters, guides and long-distance fly casters because of its higher level of difficulty. The disclosed, fly rod-attachable training line 200 can easily fit in a vest or coat pocket or can be stowed in a chest pack or fanny pack, unlike any of the practice fly rod models listed, which require rod cases to transport or carry.

Like many of my wounded warrior students, I have been diagnosed with PTSD, although my PTSD stems from a concussive injury I suffered as a child, my wounded warrior student's PTSD generally stems from their military service. I feel significant relief from my PTSD symptoms while casting the invention that I claim. I experience this relief primarily when I close my eyes during repetitive false casting. I have found this practice to be very instructive and very relaxing at the same time. I recommend to all casters that they occasionally close their eyes while false casting to better feel the tugs on the back cast and forward cast in order to acquire the muscle memory of the well-timed basic cast. There are many ongoing studies that are finding that the sport of fly fishing helps to improve PTSD, or post-traumatic stress syndrome, symptoms, primarily because it gets the fisher out to beautiful scenic settings, away from life's problems. It has also been said that the two-handed rhythmic motions of the fly fishing cast may help to balance and relax the brain centers that are associated with PTSD.

The disclosed training line 200, FIG. 2 and fly fishing training rod 100, FIG. 1 decelerates the speed of the leader which facilitates the visual experience of viewing the formation of the loop in slowed motion. This aspect of the invention allows the user to develop the positive habit of watching the leader on the backcast and forward cast in order to help them avoid obstacles like trees, shrubs, and rocks in the proximity of the cast. This helps prevent unnecessary down time, frustration, and excessive time and money spent by the student, instructor, or the guide untangling or replacing leaders and replacing lost flies. Many of my fly fishing classes are held at a lake with a walking trail around its perimeter. The habit of watching the back cast, which my invention promotes, can prevent an unwary jogger from being hooked by a student's errant back cast. Watching the back cast also helps all fishers avoid casting forward too soon which whips the line and causes the fly to break off, or the leader to tangle.

The disclosed training line 200 lets the student take up slack, and cast short distances while starting out, and then extend their distance to an average casting length of line as they progress in their ability. Fishers can practice in their own backyards, cul-de-sacs, parking lots or in fields near their fishing spots so they are better able to handle the challenging current casting situation, and challenging fly cast scenarios they will encounter in the future. This disclosed training line is also beneficial for fly shops to use in their teaching programs or when selling rods to customers because casting on asphalt, parking lots or concrete, or even in thick weedy fields near their retail fly fishing shops can damage their expensive fly fishing lines and leaders. The Macrame craft cord and paracord I use on the training line 200 is very durable and won't be damaged in those casting situations. The disclosed training line 200 is effective in demonstrating the casting characteristics because it loads the rod more than a lighter fly fishing line. Professional fly fishing guides will also benefit from using this invention to teach inexperienced clients who struggle with the basic cast or experienced clients who need slight adjustments in their technique for difficult casts they're facing during a guided trip. Further, the disclosed training line can be used year around even in rainy and snowy conditions to provide practice opportunities for the user during non-fly fishing season.

This disclosed training line 200 has become an integral teaching tool for the wounded warriors and public fly fishing classes I teach. I personally have gained some valuable insight into my own fly casting strengths and weaknesses during the development and use of this invention. This disclosed training line 200 is primarily designed for freshwater casting but I have found it to also be beneficial for learning and improving one and two handed spey saltwater casting techniques. This disclosed training line 200 could also be used in a game format, without departing from the core concepts of the invention. This disclosed training line 200 uses square knots 202A, B, C, D at all the connections which are common knots used in the fishing industry and in medical procedures, because of their strength, compact size and non-slip qualities. Other means for attaching the two different cord types and clip end are contemplated including but not limited to bowline, sheet bend, two half hitches, clove hitch, surgeon's knot, double surgeon's knot, and taut line knots. The two types of cord 204A,B, 205 may also be connected via melting, gluing, or other physical means such as a clip or clamp connection. The square knots 202A, B, C, D tied have tag ends which require trimming and heat fusing after tying, burning the coarse fiber material to make the craft cord and paracord knots less prone to fraying and slippage. Each square knot connection reduces the length of the un-tied line by approximately 3 in. The two-color fly ends 203, FIG. 2 on the disclosed training line 200 requires heat fusing only on the front side of the knot. The fly ends 203 that mimic fly wings are trimmed back to approximately $7/16$ in and left unburned to allow for controlled fraying in order to mimic insect wings. All of the lengths, colors and material composition of the disclosed training line 200 could be changed or altered without departing from the core concepts of this example. The knot type or line colors of the disclosed training line 200 could be changed without departing from the core concepts of the disclosed training line 200. I have made multiple improvements on this disclosed training line 200 since its inception and the concurrently written provisional patent No. 63/259,329, those improvements are as follows. I changed the clip mechanism 201, FIG. 2 from a #3 heavy-duty clip to a notably smaller #00 leader clip, which allows the practice line to be easily routed through the tip-top fly rod eyelet 4A, FIG. 1 instead of clipped to the tip-top eyelet 4A as was portrayed in the provisional patent referenced above. Next, I changed the 4 mm blue macrame craft cord to 2 mm blue macrame craft cord 204A, B, FIG. 2 because it slips more smoothly through the tip-top eyelet 5A, FIG. 1 and guides down to the reel. This change gave the invention a more realistic casting weight and continuity during use. This change also allowed the user to use slack-line techniques such as stripping line and shooting line, hauling line and double hauling line, or to take up slack to cast shorter more tenable line lengths. Next, I changed the paracord 205 from #550 white paracord to #95 green paracord. The #95 paracord 205 has a thinner approximately 2 mm, or 1.75 mm, diameter than the #550 paracord it replaced, and the green color doesn't get soiled visibly by dirt in fields or oils on concrete driveways as easily as the white paracord. Next, I increased the finished length to 32 ft for a length that approximates the casting motion and feel of an average fly fishing cast. Then I looped the line 200 through the outer reel 5, FIG. 3 and clipped, with clip 201, the line 200 back onto itself as shown in FIG. 3. Running the line 200 through the tip top eyelet 4A, FIG. 1 and guides distributes the pressure load evenly throughout the length of the fly rod instead of just putting stress on the more fragile tip of the rod, as the initial design depicted in the provisional utility patent referenced above. Looping the clip 201 and training line 200 through the outer reel frame is depicted in this application, but the hook keeper or any other adjacent acceptable mounting location in the proximity of the reel could be used without departing from the core concepts of disclosed training line 200. Clipping the disclosed training line 200 in this manner allows the user to keep the actual fly line setup on the reel intact, so this disclosure can be used for practice, and then the user can set-up for fly fishing in a minimal amount of time. As mentioned above, the disclosed training line 200 allows the user to practice the techniques of shooting line, stripping line, hauling and double hauling line with slackline that's held in the user's non-casting hand. Additionally, the disclosed training line 200 can be used with the actual fly fishing fly still attached to the fly line leader with the fly hook clipped to the fly rods hook keeper if so desired. I have also tested and used this disclosed training line 200 on wet concrete to practice the roll cast. The wet concrete provides the necessary resistance and surface tension to give the line the rolling effect of the cast. The materials and procedure used to construct this invention are as follows: First, as shown in FIG. 2, #00 clip 201 is tied to a 22 ft 9 in length of blue 2 mm macrame craft cord 204A using a square knot 202A, B, C, D. Then the other end of that cord is tied using a square knot to a 5 ft 6 in length of green #95 paracord 205. The green #95 paracord 205 is then tied to a 4 ft 6 in length of 2 mm red macrame craft cord 204B. A 5 in length of 2 mm green macrame craft cord 203 is tied to the terminal end 302B of the red 2 mm macrame craft cord 204B with a square knot 202A, B, C, D. A 5" 2 mm green macrame craft cord 203 in conjunction with the terminal end 302B of the 2 mm red macrame craft cord 204B results in a green and red fly 203 after heat fusing and trimming 203. For the 32' version a small section of green macrame cord is knotted to the end of the green 204B macrame cord to form the fly 203. All the fly tag ends 203 of the square knots tied, excluding the "wings" on the fly, have fly/tag ends 203. The tag ends are then heat fused or burned off using a direct flame from a torch lighter to form a domed surface that ends as close to the knot as possible without burning the adjacent lines. The actual finished length of the disclosed training line 200 is 32 ft or 9.144 meters which is comprised of 22 ft 6 in of 2 mm blue macrame craft cord 204A for the main running line FIG. 2, 5 ft 3 in of #95 green paracord 205 for the weighted front leader mid-section, 4 ft 3 in of 2 mm red macrame craft cord 204B for the terminal leader section, and the fly 203 which is composed of the 2 mm red macrame craft cord and 2 mm green macrame craft cord combined. The length, color, and material composition of the disclosed training line could be altered or modified without departing from the core concept of the disclosure. It is envisioned that the entire length of the training line may be less, being as much as 15 ft, or 20 ft, 25 ft, 30, 32 feet or more.

Example 2

A shorter length version of the training line 200, FIG. 2 may be employed. This version is designed for 4'6" through 6'6" working fly fishing rods with reels 5, FIG. 1 attached to a reel seat 1 that may or may not have fly fishing line 6 spooled onto the reel. The shorter length version has the same material composition including the leader clip 201 mechanism and uses the same construction methods as the 32' 6" training line described herein. The total length of the short version training is 22'6". The line finished segment lengths are as follows: blue 2 mm main running line segment is 16' in length, the green #95 paracord weighted front leader segment is 3'6", and the red 2 mm terminal leader section is 3' including the green and red 2 mm macrame craft cord 2-color fly. The shorter length version is primarily intended for indoor training and practice use. The colors of line segments and their lengths may be altered without departing from the core concepts of the disclosed training line 200.

Example 3

During the early product development of the disclosure, I produced and tested a prototype of the disclosure consisting of a 32' length of weight forward 5 weight fly fishing line (not shown). I tied a clip mechanism, for example 201, FIG. 2 to the back end of the line and trimmed the tag end of the knot. Then I tied one 5" length of 2 mm red macrame craft cord and a second 5" length of white 2 mm craft cord to the terminal weighted forward leader end of the fly fishing line using a square knot. I trimmed the front two tag ends of this knot and heat fused or burned the frayed ends to simulate the head of the fly and trimmed the remaining two tag ends to ⅞th" and left them unburned in order to simulate wings, as in 203, FIG. 3, and thus complete the 2-color imitation fly. I then connected this training fly fishing line to a 9' fly fishing rod by threading the clip mechanism through the tip top eyelet and down through the guides to the reel, as in FIG. 1. I then clipped the training line to the outer reel frame brace. This prototype functioned as an actual fly fishing line does while casting. It did not however decelerate the line speed like the 2 mm macrame craft cord, nor did it possess the slow motion visibility of the loop formation or the highly visible 2 mm red macrame craft cord leader section. I found this configuration to be a workable practice line for fly fishing rods mainly for prospective rod purchasers. This iteration of the disclosure proved to be cost prohibitive for me to manufacture at the time, because I needed to use an entire new fly fishing line to produce it. I am fully aware that a fly fishing line manufacturing company could formulate such a practice line at a relatively reasonable cost. This training fly fishing line which attaches to fully functioning fly fishing rods with reel seats which have reels attached to them like the disclosure, will become a feasible product for me to manufacture in the near future after contacting fly fishing line manufacturers. This training fly fishing line falls within the parameters of the disclosure because It attaches to fully functional fly fishing rods. The invention further comprises a fly fishing training line comprising a single unsegmented cord comprising a clip on one end and imitation fly on the other end, the training line further comprises an attached fly fishing rod with a reel and casting line attached thereto.

Example 4

In a non-limiting example, the present disclosure is an improved fly casting training cord line FIG. 4, 300, a method of forming an improved fly casting training cord line, and a method of teaching fly casting using the improved fly casting training cord line. As exemplified in FIGS. 4-5 an improved fly casting training cord line 300 comprises a first section of cord 301 comprising a first end 301A and a second end 301B. The first end was attached via cord connector 304 to a training line connector 305 clip but may be attached via other means of connecting the training cord line 300 to a fly fishing rod 100 or a fly fishing line 6 or backing 6B as shown in FIGS. 1, 3, 6, and 7. The improved fly casting training cord line 300 may be attached to any fly fishing rod FIGS. 1 and 3, 100 or reel 5 at, on or near the reel 5 either at the reel seat 1, the handle 2, on the reel 5, the reel handle 7, to the fly fishing line backing, or any part of the fly fishing line. The length of the improved fly casting training cord line 300 may be about at least 20 feet, or at least about 25 feet, or 30 feet, or 31 feet, or 32, feet, or 33 feet, or 34 feet, or 35 feet, or 40 feet, or 45 feet, or more. The improved fly casting training cord line of the present disclosure was 33.5 feet in length total.

In the present example, a 24 foot section of a first section of cord 301 was formed of a paracord being a dense fibrous cord available in various weights, diameters, and colors as described herein, in this case #95 paracord. The first section of cord 301, the #95 paracord length, which is a 95 pound (lb.) tensile strength and has a 1.75 mm diameter, was joined to the training line connector 305 clip using a 0.75 inch strip of 1/8$^{th}$ double walled adhesive lined heat shrink tube cord connector 304. The training line connector 305 clip was attached to the shrink tube cord connector 304 with a 1 inch strand of the 3/64$^{th}$ inch micro paracord 306 which threaded through the training line connector 305 clip. The free end of the 3/64$^{th}$ inch micro paracord 306 was attached to the first end 301A of the first section of cord 301 by putting a drop of superglue on each of the ends and then inserting them into the shrink tube cord connector 304. With the two ends joined via super glue inside the shrink tube cord connector 304, heat was applied to the shrink tube to melt the shrink tube thereby shrinking it and bonding it to the two cords 306, 301A, thereby bonding the two cords together. In this example the length of the improved fly casting training cord line 300 equaled 33.5 feet. The overall length of the improved fly casting training cord line could be increased to 40 feet for rods up to 12 feet in length and reduced to about 24 feet for shorter rods of about 5 feet. The first section of cord 301 as described above may comprise about half, or 50%, or about 55%, or about 60%, or about 70%, or about 75% of the entire length of the improved fly casting training cord line 300. Use of the improved training cord line 300 with any fly fishing rod is possible. The length of the second section of cord 302 may be about equal to the length of the fishing rod plus 6 inches of cord to wrap around the reel seat FIG. 1, 1 or rod shaft FIG. 1, 3.

As shown in FIG. 5B, in a similar manner as the training line connector 305 clip was attached to the first section of cord 301, FIG. 5A, the first section of cord 301 was attached to the second section of cord 302. The second or free end of the first section of cord 301B was attached to the first end of the second section 302A via adding super glue to the ends and sliding them into a shrink tube cord connector 304 then heating the shrink tube cord connector 304 connector. The second section of cord 302 was comprised of a 2 mm diameter macrame cord. The third section of cord 303 may be formed from a range of different types of cord or rope. For the present improved fly casting training cord line 300, a small section of cord 303 was connected to the second end of the second section of cord 302B via super glue and a shrink wrap cord connector 304 as described before and shown in FIG. 5C. The end of the third section of cord 303 was brushed with a wire brush to expand the fibers to create an imitation fly 303.

For teaching casting with the improved fly casting training cord line 300 disclosed herein, the fly casting training cord line 300 was attached to a fly fishing rod as described above. The improved fly casting training cord line 300 of the present disclosure is not intended to be used in a water environment although it may be. The improved fly casting training cord line 300 disclosed herein has been used in a parking lot, grass or dirt lawn or fields, indoors, and in other desired locations. The user FIG. 1, 500 attaches the training line connector FIG. 4, 305 clip to a fly fishing rod which may or may not include a fly fishing line of its own. The improved fly casting training cord line 300 was threaded through the fly rod's tiptop eyelet FIG. 1, 4A, down through the snake guides 4C, and stripping guide 4B to the reel 5, and attached thereto. The improved fly casting training cord line 300 could be attached, near the reel, to the backing line, or any part of the fly fishing line or fly fishing rod. In this way, the improved fly casting training cord line 300 mimics a real fly fishing line but is more durable and able to be used with any rod on any surface. To cast, the rod 100 was swung back behind the user 500 and then swung forward in front of the user propelling the improved fly casting training cord line 300 forward to a desired location. The rod 100, or end of rod near the tiptop eyelet 4A, may be directed one direction to the right of the user 500, for example, and then another direction, to the left of the user 500, to move the improved fly casting training cord line 300 back and forth over an area to teach fly fish casting. This motion and following of this motion of the improved fly casting training cord line 300 back and forth using lateral eye movements has been shown to relieve stress and symptoms of PTSD by recent studies, promoting not only fly fishing casting skills but overall mental health, via a mechanism of shutting off the release of the stress hormone cortisol from the amygdala in the brain. Various colors of each section may be chosen to help improve fly casting skills and lateral eye movement.

Although the present disclosure has been described with reference to the disclosed embodiments, numerous modifications and variations can be made and still the result will come within the scope of the disclosure. No limitation with respect to the specific embodiments disclosed herein is intended or should be inferred. Each apparatus embodiment described herein has numerous equivalents.

What is claimed is:

1. A fly casting training line comprising:
    a) a first end and a terminal end;
    b) a heavier weight per unit length cord of a first diameter, wherein the heavier weight per unit length cord forms the first end;
    c) a lighter weight per unit length cord of a second diameter, wherein the lighter weight per unit length cord forms the terminal end;
    d) wherein the heavier weight per unit length cord and lighter weight per unit length cord are connected to form the fly casting training line; and
    e) wherein the first diameter is smaller than the second diameter.

2. The fly casting training line of claim 1 further comprising a clip attached at the first end.

3. The fly casting training line of claim 1 further comprising an imitation fly attached at the terminal end.

4. The fly casting training line of claim 1, wherein the heavier weight per unit length cord is a paracord and the lighter weight per unit length cord is a macrame cord.

5. The fly casting training line of claim 4, wherein the paracord is #95 paracord.

6. The fly casting training line of claim 4, wherein the macrame cord has a diameter of 2 mm.

7. The fly casting training line of claim 1, wherein the heavier weight per unit length cord comprises at least sixty percent of the length of the fly casting training line.

8. The fly casting training line of claim 1, wherein the heavier weight per unit length cord is connected to the lighter weight per unit length cord via a shrink tube.

9. The fly casting training line of claim 1, wherein the heavier weight per unit length cord is connected to the lighter weight per unit length cord via glue and a shrink tube.

10. A method of forming a fly casting training line, the method comprising:
    a) forming a fly casting training line having a first end and a second end;
    b) wherein the fly casting training line comprises two different line materials, a heavier material of a first diameter disposed at the first end, and a lighter material of a second diameter disposed at the second end;
    c) connecting the heavier line material to the lighter line material to form the fly casting training line;

d) wherein the first diameter is less than the second diameter.

11. The method of claim 10 further comprising connecting an imitation fly at the second end.

12. The method of claim 10, wherein the line materials are connected via shrink tubing.

13. The method of claim 10, wherein the line materials are connected via gluing and shrink tubing.

14. The method of claim 10, wherein the heavier material comprises at least 65% of the length of the fly casting training line.

15. A method of learning fly casting comprising:
   a) forming a fly casting training line having a first end and a second end;
   b) wherein the fly casting training line comprises two different line materials, a heavier material of a first diameter disposed at the first end connecting to a lighter material of a second diameter disposed at the second end;
   c) wherein the first diameter is less than the second diameter;
   d) fitting the fly casting training line to one of a fly fishing rod reel, a fly fishing line of the fly fishing rod, and a fly fishing line backing of the fly fishing rod; and
   e) using the fly fishing rod to cast the fly casting training line.

16. The method of claim 15, wherein the fly casting training line is connected to a backing of the fly fishing rod.

17. The method of claim 15, wherein the fly casting training line is connected to a fly fishing line of the fly fishing rod.

18. The method of claim 15, wherein the fly casting training line is connected to a fly fishing rod reel.

19. The method of claim 10 further comprising connecting a means of attaching the fly casting training line to a fly fishing rod at the first end.

20. The method of claim 19 wherein the means of attaching the fly casting training line is a clip.

* * * * *